Figure 1:
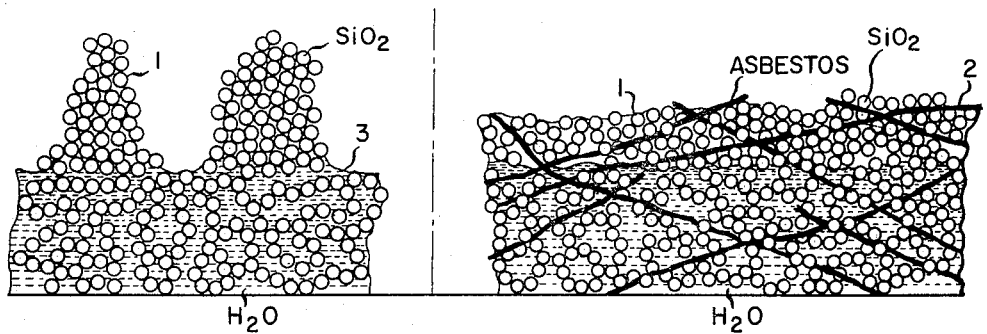

Oct. 9, 1962   G. D. BARBARAS   3,057,744
FILM FORMING COMPOSITION
Filed Aug. 31, 1959

INVENTOR
GLEN D. BARBARAS
BY
ATTORNEY

United States Patent Office 3,057,744
Patented Oct. 9, 1962

3,057,744
FILM FORMING COMPOSITION
Glen D. Barbaras, Brandywine Hundred, Del., assignor to E. I. du Pont de Nemours and Company, Wilmington, Del., a corporation of Delaware
Filed Aug. 31, 1959, Ser. No. 837,270
11 Claims. (Cl. 106—286)

This invention relates to film-forming compositions which are sols of isodiametric and anisodiametric particles, the total weight of the isodiametric particles being at least twice that of the anisodiametric particles. The invention also relates to films formed therefrom.

Figure 2:
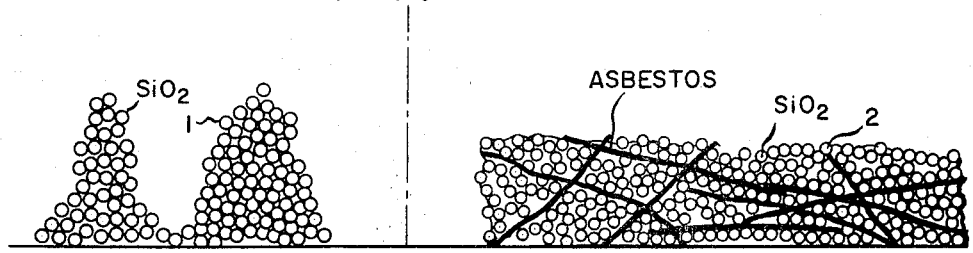

In the drawings:

FIGURE 1 illustrates a partially dried film of the invention in which the isodiametric particles are silica and the anisodiametric particles are asbestos, and FIGURE 2 illustrates a similar film after drying.

If a colloidal dispersion of isodiametric particles of a metal oxide in water is dried, the particles are concentrated to the point where they link together forming an open network of gel. If the colloidal particles are rigid and relatively inelastic this gel structure is relatively rigid and inelastic. As water continues to be removed from such a gel mass, shrinkage of the mass inevitably occurs due to the surface tension of the water. Since the gel structure is inelastic and relatively weak, cracks begin to develop on a microscopic scale. As drying is continued, the colloidal oxide finally remains in the form of granules which are made up of aggregated ultimate colloidal particles. No coherent mass or continuous film is produced. Thus if a silica aquasol is applied to a surface and dried, a non-adherent deposit is obtained which is little more than a dust which can be blown or brushed from the surface. Such a deposit has no coherence and is not in any sense a film.

I have found that coherent and adherent films can be made using insoluble metal oxides of isodiametric particles of colloidal dimensions providing there is included a small amount, by weight, of an anisodiametric, inorganic, colloidally dispersed material. By "colloidally dispersed" is meant that the anisodiametric material is in the form of particles having two dimensions in the colloidal range not exceeding 150 millimicrons.

The term "isodiametric" is employed herein in the customary sense of referring to particles which have all three dimensions of approximately the same order of magnitude. Thus, they are approximately spherical or cubical, or in any event no dimension is greatly in excess of that of any other. "Anisodiametric" particles are, of course, those in which this is not true and in which one dimension is greater than others as exemplified by fibrils of inorganic particles as will be hereinafter described at greater length.

The operation and nature of the invention will be better understood by reference to the drawings in which a preferred species is exemplified. In FIGURE 1 there is shown on the left a partially dried film of silica particles which are illustrated in cross section on a supporting surface. Water is shown in the lower portion of the film and it will be seen that in the dried portion of the film 1, from which the water 3 has evaporated, the silica structure has become contracted into dense regions with cracks lying between them. On the right there is illustrated a composition of the invention in which asbestos fibrils of colloidal dimension have been included. Here the drying has not resulted in such deformation of the film but rather there is a uniform contraction.

The effect is further illustrated in FIGURE 2 in which the drying of the film is complete. On the left is seen the typical dusty deposit which is obtained when a silica sol is dried, while on the right is seen a film of the present invention in which asbestos fibrils have preserved the integrity of the surface so that a continuous, adherent film results. This will be discussed further hereafter in connection with specific compositions.

*The Sols of Isodiametric Particles*

The sols of isodiametric particles are well illustrated by silica sols, a preferred embodiment of the invention, and these will first be discussed.

Any stable silica sol can be used according to the invention and there can be used, for example, sols prepared according to processes shown in Bechtold and Snyder Patent 2,574,902. The sols of this patent have uniform, discrete, spherical particles from about 15 to 150 millimicrons in diameter. Preferred sols of the Bechtold and Snyder patent are those which have particles up to about 30 millimicrons.

Sols quite suitable for use according to the invention are those in which the particle size range is rather small, say from 5 to 9 millimicrons. These can be prepared by processes described in Alexander Patent 2,750,345. The low-electrolyte sols of Rule Patent 2,577,485 and the ammonia-stabilized sols of the already-mentioned Bechtold and Snyder patent are among the preferred sols to use.

Also suitable are sols prepared as in White Patent 2,375,738 though these contain particles which are somewhat aggregated and hence the sols cannot be used where it is desired to use a sol of high concentration in preparing compositions of the invention. The sols of the Bird Patent 2,244,325 and Voorhees Patent 2,457,971 can also be used. Sols can also be prepared according to processes of U.S. Patents to Trail 2,573,743 and Legal 2,724,701. Similarly, the alumina-modified silica sols of Alexander and Iler Patent 2,892,797 are suitable for use in the novel compositions.

The most stable silica sol compositions for use according to the present invention are those in which the pH ranges between pH 8 and 10.2 and which are relatively free from electrolytes.

The amounts of silica in the sols used in compositions of the invention can vary widely and will range from 10 to 70% by weight. Lower concentrations are generally impractical. The permissible concentration depends to some extent on the particle size. Stable sols can be prepared at the higher concentrations only if the particles are extremely uniform and of fairly large size. This is well understood.

Preferred film-forming compositions of the invention contain silica sols in which there is 15% to $$\frac{110}{(1+0.000667A)^3+0.6}$$

percent of $SiO_2$ by weight. In the above fraction, A is the specific surface area of the silica particles. This can be determined by nitrogen adsorption in a manner already well understood in this art.

The particle diameter as determined by the electron microscope may also be used for calculating the specific surface area in accordance with the methods described by G. B. Alexander and R. K. Iler, Journal of Physical Chemistry, volume 57, page 932, 1953.

Even more preferred silica sols are those which are somewhat more stable and which do not contain more silica by weight than:

$$\frac{70}{(1+0.000667A)^3+0.6}\%$$

Instead of using aquasols one can prepare compositions of the invention using organosols of silica and of other isodiametric particles. Aqueous silica sols as above described can be converted in known manners to organosols with such organic solvents as isopropanol, butanol, 2-ethoxy-ethanol, and the like. The transfer of the silica to the organic medium can often most conveniently be effected in the presence of asbestos or such other anisodiametric particles as are used in compositions of the invention.

Instead of using a silica sol one can use colloidal dispersions of other isodiametric, water-insoluble, ceramic metal oxide particles. By water-insoluble is meant that the particles do not dissolve in water to the extent of even $\frac{1}{10}$ of 1% by weight and are not converted in water to any other soluble product. Typical ceramic metal oxides which can be used are zirconia, silica, alumina, thoria, didymia, titania, chromia, and hafnia. "Didymia" is a term commonly employed to refer to unseparated mixtures of rare earth metal oxides other than thoria.

The ceramic metal oxides employed according to this invention include not only the anhydrous oxide particles such as silica, but also certain hydrous oxides such as are commonly obtained in colloidal form as in the case of oxides of aluminum, chromium, and iron.

The dispersions of such isodiametric ceramic metal oxides used in making film-forming compositions of the invention can contain from, say 10 to 70% by weight of the metal oxide.

The preferred metal oxides for use according to the invention are those selected from the group consisting of zirconia, silica, alumina, thoria, didymia, and titania.

The preparation of sols of the metal oxides is already well understood. One method which can be employed for the production of all of these oxides is the combustion of dilute vapors of volatile compounds of the metals. The oxides are thus produced in extremely finely divided form and can then be dispersed in water or another suitable solvent by adjustment of pH and by colloid milling.

As with the silica sols, the aquasols are preferred but organosols can be prepared in the same way as above generally described and as already known in the art.

*The Colloidally Dispersed Anisodiametric Particles*

A preferred product containing anisodiametric particles for use in film-forming compositions of the invention is asbestos. Any fibrous form of asbestos can be employed but chrysotile asbestos is preferred because of the ease with which the material can be reduced to its ultimate fibrils and to colloidal dimensions.

Other forms of asbestos such as tremolite, amosite, and crocidolite can be used although these require more severe milling and grinding in order to disperse the products into colloidal fibrils.

Other colloidally dispersed inorganic fibrils can be used in compositions of the invention. Thus, there can be used as the anisodiametric particles fibrils of silicate minerals which are colloidally dispersed. Attapulgite, hectorite, and halloysite clay are representative of such silicate minerals.

In general any silicate mineral can be used which is present in nature or can be formed synthetically and which is or can be colloidally dispersed and which is anisodiametric. The shape can vary considerably from fibrous to ribbon-like or lathe-like. One dimension ought to be at least eight times as great as the next greatest dimension so that the product is suitably anisodiametric. It is also preferred that the greatest dimension be at least 500 millimicrons but the remaining two dimensions ought to be in the colloidal range not exceeding 150 millimicrons.

It is to be observed that particles should not ordinarily be present which exceed one-quarter inch in length and this is particularly true of asbestos. Asbestos fibrils may be reduced to lengths below one-quarter inch by suitable grinding procedures.

The amount of the anisodiametric particles may range from 0.1 to 10% and preferably 0.1 to 5% by weight of the liquid dispersion. In any event, the weight of isodiametric metal oxide particles is at least twice the weight of anisodiametric particles. More specifically it is preferred that the anisodiametric particle be present in compositions of the invention in amounts from about 0.1 to 3% by weight.

As has been observed generally above, the anisodiametric particles such as asbestos can be included in organosols of the isodiametric particles by adding an organic solvent to the mixture in an aquasol and removing water in conventional manner. In order to avoid flocculation it may be necessary to adjust the pH, in accordance with the knowledge of those skilled in the art. It is further to be observed that suitable dispersing agents can be included in compositions of the invention to add to their stability. Thus, long-chain hydrocarbon sulfonates or polyethylene oxide type surface-active agents of conventional character can be used in small amounts, say $\frac{1}{10}$ to 2% by weight in the final composition. Soaps can also be used.

Film-forming compositions of the invention can best be prepared by making an appropriate mixture of the isodiametric and anisodiametric particles and subjecting them to working and shear. This can be done as in a ball mill or a colloid mill or a sand grinder or a high-shear agitator.

In some of the sols which are very highly concentrated the viscosity may be so high as to make the film-forming compositions appear to be a gel or paste. However, stiffness or thickness of the composition is not to be construed as making it unsuitable for application according to the invenion. For example a thick composition can be applied by troweling or rolling.

The film-forming compositions of the invention can be applied to paper, to fabrics including pile fabrics such as rugs, and to inorganic sheets such as asbestos. They can be used in combination with mica flakes or granules of ceramic oxides such as corundum, alundum, or finely divided refractory powders such as zirconium oxide, silicon nitride, silicon carbide, boron carbide boron nitrile, an dother hard refractories.

The film-forming compositions of the invention upon drying, whether on a flat substrate or upon powders and the like as described, form a coherent film. Such films are products of the invention. It will be seen from the above that these films contain the isodiametric and anisodiametric particles in the proportions by weight previously set forth.

The coatings of the invention are particularly useful for increasing the temperature resistance of the substrates to which they are applied. Thus, for example, a composition of thoria containing asbestos can be applied to fire brick and the surface thereof thus converted to an extremely resistant refractory.

The compositions of this invention can also be used as coatings or as adhesives or binders for a wide range of materials including ceramic bodies.

The invention will be better understood by reference to the following illustrative examples.

EXAMPLE 1

Five grams of relatively long fibered No. 2 white Arizona chrysotile asbestos was stirred in 200 grams of an alkali-stabilized silica sol, containing 50% of colloidal silica in the form of particles having an average size of about 20 millimicrons.

Ninety-one grams of this mixture, containing therefore 2.2 grams of asbestos, was mixed with 273 grams of additional silica sol and ground in a small ball mill. Very shortly the mixture became so thick the balls would not grind properly. The mixture was removed and placed in a Waring blendor, and 1 cc. of dilute ammonium hydroxide (9% NH$_3$) was added. The mixture was still too thick, so that further amounts of colloidal silica sol were added, until the total addition was 280 grams. The final total weight was 644 grams.

The final asbestos content was 0.34%, and the silica concentration over 50%.

This silica sol-asbestos composition was compared with the unmodified silica sol for a variety of uses. For example, a shiny, hard, flameproof coating of silica was applied to cellulosic paper simply by painting the viscous sol onto the surface with a brush and permitting it to dry. It was like a semitransparent paint. The sol, unmodified with asbestos, applied in a similar manner, soaked immediately through the sheet and there was no coating on the surface.

A similar experiment was made with commercial asbestos paper. The thickened sol formed a hard, adherent, clear finish like a lacquer and did not soak into the asbestos sheet. The unthickened sol soaked completely through the sheet.

The thickened mixture also had adhesive characteristics. It did not give a very strong bond like sodium silicate, but the bond was sufficiently strong to cement together sheets of asbestos paper, for example. When dried and heated, the silica in the bond did not intumesce or foam up, as sodium silicate does, and the bond remained strong. The unthickened sol had no adhesive characteristics, apparently because it soaked into the sheet and did not remain at the boundary between the two surfaces joined.

EXAMPLE 2

This example illustrates the use of short-fibered asbestos in a composition of the invention.

Two grams of relatively short-fibered No. 5 asbestos was moistened with 4 grams of water and placed in a high-speed mixer with 100 grams of an alkali-stabilized silica aquasol containing 54% $SiO_2$ by weight in the form of particles having an average diameter of 30 millimicrons. Within a minute, the mixture was extremely viscous. Two hundred grams of sol was added, which gave a more fluid mixture, and to which another 3.5 grams of fiber moistened with 5 grams of water was added to again thicken the mixture. Thereafter, another 60 grams of sol was added to thin it out, so that it would be viscous, but still pourable.

The mixture, which was full of very fine foam, was deaerated by subjecting it to a vacuum, corresponding to a pressure of about 5 millimeters of mercury, and a smooth, translucent, viscous fluid was thus produced. This mixture contained about 1.5% dispersed asbestos fiber and 54% colloidal $SiO_2$.

EXAMPLE 3

This example illustrates the application of the invention to a silica sol stabilized with ammonia.

Two grams of long-fibered No. 2 chrysotile asbestos (white Arizona type) was chopped into lengths ranging from ⅛ to ¼ inch and was moistened with 5 grams of water and mixed with a high-speed stirrer into 400 grams of a 15 millimicron silica sol containing 30% $SiO_2$, stabilized with a small amount of ammonia. The high-speed mixer (Waring blendor) was run for 3 minutes, while the mass was stirred in the container above the rotating blades, to insure homogenization. There was produced a highly viscous, translucent, thixotropic mass which would barely flow when poured, but could be easily stirred with a spatula. When a sample of this composition was placed on the surface of a plate of glass in a layer of about ⅟₁₆ inch thick and permitted to dry, it gave a coherent white coating.

EXAMPLE 4

This example illustrates the use of hectorite clay as the anisodiametric component of a composition of the invention.

Hectorite clay is a colloidal form of bentonite consisting of ribbon-like particles of colloidal size. Three grams of California hectorite was moistened with 5 grams of water and added to 100 grams of silica aquasol of Example 3. This was mixed with a high-speed stirrer for about 2 minutes, to give a very viscous, thixotropic, but still pourable fluid. When this mixture was spread in a thin film on glass and permitted to dry, there was some crazing, but sheets of silica, reinforced with the clay, ¼ inch wide and up to 1 inch long, could be removed from the glass. Without the hectorite clay, the silica aquasol on glass dried to a deposit which crazes into hair-like particles which are extremely fragile and fall apart to dust.

EXAMPLE 5

A mixture similar to the above was made by moistening 3 grams of the hectorite with 5 grams of water, giving a hard, stiff clay mass, which was added to a high-speed mixer containing 200 grams of a 54% silica sol consisting of 20 millimicron particles. After running the mixer for 2 minutes, a very smooth, transparent, grease-like mass having the consistency of soft butter, was obtained. This material, when dried in a thin film on the surface, formed coherent fragments up to ¼ inch diameter, whereas the unthickened sol dried essentially to a finely crazed, dusty deposit.

EXAMPLE 6

This example illustrates the preparation of a composition of the invention from a thoria aquasol and chrysotile asbestos.

To 100 grams of a 23.4% thoria sol containing thoria particles about 10 millimicrons in diameter, there was added 0.5 gram of long-fibered No. 2 white chrysotile asbestos, previously wetted with 3 cc. of dilute acetic acid, to give a pH of about 4.5. This mixture was then stirred in a high-speed blendor, and gave a white, viscous fluid. When dried, this mixture formed a coherent sheet or film which could be lifted from the supporting surface. The thoria sol alone, without asbestos, dried to a white, dusty deposit. The addition of the dispersed asbestos completely changed the character of the residue obtained when the sol was dried.

EXAMPLE 7

This example illustrates the use of zirconia as the isodiametric component of a composition of the invention.

One gram of No. 2 chrysotile asbestos was added to 200 grams of a zirconia sol containing 24% $ZrO_2$ and stabilized with hydrochloric acid and mixed in a Waring blendor at high speed for about 2 minutes. The sol slowly developed viscosity, but remained a thick, pourable liquid.

The mixture contained a great deal of air which must be removed. The mixture was placed in a one-liter suction flask while it was slightly warm from the Waring blendor, and vacuum from a water pump applied. The mass swelled several-fold, but with continued shaking, the foam collapsed and bubbling ceased.

The presence of this small amount of dispersed asbestos made a remarkable difference in the nature of the zirconia obtained on drying zirconia sol. With asbestos absent, a powder was obtained; with the asbestos present, a coherent sheet of zirconia was produced.

EXAMPLE 8

The compositions of this invention can be used as inorganic paints which are particularly useful for application to stone, brick and masonry. Conventional organic paints deteriorate in the sunlight and are degraded by the alkali present in mortar and concrete, whereas paint made with the compositions of this invention is permanent.

Four hundred parts by weight of a 30% silica sol stabilized with ammonia was employed as the base for a paint composition. Eighteen parts by weight of a very finely divided red iron oxide pigment and four parts by weight of short fibered chrysotile asbestos were mixed and wetted with 35 parts by weight of water and 10 parts by weight of concentrated ammonium hydroxide solution containing 28% $NH_3$. The colloidal silica was placed in a high-speed mixer and the moistened mixture of iron oxide and asbestos added and the mixture blended and dispersed for 3 minutes. An additional 6 parts by weight of the asbestos fiber was then added and the mixture became extremely thick, whereupon another 220 parts by weight of ammonia-stabilized 30% colloidal silica was added to reduce the viscosity, and mixing was continued for 5 minutes.

The deep red, viscous, thixotropic fluid obtained was of suitable consistency for application as a paint. It was employed for painting a concrete wall and also for coating a concrete basement floor. The paint dried rapidly and was sufficiently adherent within an hour that no color could be rubbed off with the fingers. It was also suitable for painting weathered wood, giving a highly adherent, deep red finish.

For use on non-porous surfaces such as metals or painted wood, it is necessary to employ a somewhat larger amount of iron oxide to obtain better hiding power, and reduce the amount of asbestos to reduce the viscosity and improve spreading.

EXAMPLE 9

This is an example of a composition of this invention comprising a dispersion of 0.5% by weight of No. 2 white Arizona chrysotile asbestos, colloidally dispersed in a silica sol containing 30% $SiO_2$ in the form of amorphous silica particles having an average diameter of about 15 millimicrons, stabilized with 0.27% of ammonia. The asbestos fiber was chopped into lengths ranging from ⅛ to ¼ inch maximum. The sol was placed in a high-speed mixer fitted with rotating sharp blades and known as a "Waring blendor," and the blades operated at a speed of from 5,000 to 10,000 r.p.m. The fiber was then added to the mixer in small increments over a period of one minute, and the mixing continued for 3 minutes. There was obtained a translucent, viscous fluid from which the air bubbles were removed by subjecting the mixture to a vacuum sufficient to cause the water to boil briefly, while the mixture was slowly agitated. Not over 1% by weight of water was removed from the mixture by this treatment.

When a sample of this composition was placed on the surface of a plate of glass in a layer about 1/16 inch thick and permitted to dry, it gave a coherent, white coating.

EXAMPLE 10

As an example of this invention, 0.5% by weight of No. 2 white Arizona crysotile asbestos, chopped into fibers no longer than about ⅛ inch, was added slowly to a thoria sol in a high-speed mixer. The thoria sol contained 23% by weight of $ThO_2$ in the form of particles between 10 and 20 millimicrons in diameter, and was stabilized with sufficient nitric acid to give a pH of about 3. After dispersing the asbestos by running the mixer at very high speed for 4 minutes, there was obtained a very white, opaque, viscous fluid, full of entrained bubbles of air. This air was removed as in the preceding example, by application of a high vacuum to cause incipient boiling of the water.

This viscous fluid, when dried on a smooth surface, gave a hard, translucent film consisting essentially of thoria. A thin coating of this thoria-containing composition was applied with a paint brush to the surface of porous firebrick and permitted to dry. When subjected to a high temperature, oxygen-natural gas flame, the surface of the treated firebrick was more resistant to melting than the uncoated brick surface.

EXAMPLE 11

A colloidal zirconia sol, stabilized with hydrochloric acid and containing about 24% by weight of $ZrO_2$ in the form of zirconia particles less than 100 millimicrons in diameter, was placed in the high-speed mixer of Example 9. To the zirconia sol under violent agitation, was added 0.5% by weight of No. 2 white Arizona chrysotile asbestos, which had been previously chopped into fibers shorter than ¼ inch in length.

The fiber was added over a period of about 2 minutes, and high-speed stirring was continued for another 2 minutes, whereupon the mixture was a white, viscous fluid. It was then deaerated by being subjected to a sufficiently high vacuum to cause incipient boiling of the water.

The product of this example was useful as a binder for a zirconia ceramic body. Thus, 15 parts by weight of this composition of this invention were mixed with 62 parts by weight of zirconium oxide powder, stabilized with several percent of calcium oxide, and consisting of a suitable distribution of particle sizes, ranging from about 30 mesh to 325 mesh, to give a close-packed mixture. This composition was a thick, heavy paste or cement. It was troweled into a mold in order to make a bar of solid zirconia, 10 inches long, ½ inch wide and ¼ inch thick, useful as a support for clay ceramic bodies during firing. When air dried, the molded piece was coherent and strong enough to be handled without breakage. It was then fired to a temperature of 1300° C. for one hour, and permitted to cool in the furnace. It was found to have a strength corresponding to a modulus of rupture of 2,000 p.s.i.

EXAMPLE 12

The following exemplifies the use of the composition of Example 9 as a binder in a ceramic body consisting largely of silicon nitride.

Twenty-seven parts by weight of the composition of Example 9 was mixed with one part by weight of a 24% solution of ammonium nitrate with rapid agitation, and this viscous mixture was then mixed with 50 parts by weight of silicon nitride, $Si_3N_4$, in the form of a powder ground to pass a 150 mesh screen. The soft, plaster-like mass was extruded into rods ¼ inch in diameter, and 4 inches long. It was also pressed into an aluminum mold previously treated with a mold-release agent, to form a bar 10 inches long, ½ inch in diameter, and ¼ inch thick. It was permitted to dry at 40° C. for 2 days, at which time it was found to be a sound coherent, hard ceramic-like material, even though it had not yet been fired. After being heated for 1 hour at 1500° C., it was removed from the furnace, and found to be extremely strong and hard, having a modulus of rupture of 5860 p.s.i. It was suitable for use as a support for metal specimens to be heated in a furnace at 1200° C.

EXAMPLE 13

A composition of the present invention, containing about 50% by weight of silica and 1.5% by weight of a hectorite clay was prepared as follows:

To a silica sol containing 50% by weight of $SiO_2$ in the form of 20 millimcron particles, stabilized to a pH of about 9 with ammonia, there was added 1.5% by weight of hectorite in the form of a dry powder. The mixture was stirred violently for 10 minutes with a high-speed mechanical mixer. It was thereafter deaerated by applying a vacuum sufficient to cause incipient boiling of the water. There was obtained a thixotropic, translucent fluid.

The composition just described was applied to a glass surface.

In thin layers it formed an adherent hard film. In layers 1/16 inch thick, after being dried, it formed a non-adherent, but coherent film consisting largely of silica. This film could be removed in small sheets, whereas an attempt to make a similar film from the same colloidal silica without the addition of hectorite gave a fragile, hair-like, non-coherent deposit.

The composition of this example was also applied to the surface of paper. It was found to give essentially continuous, adherent coatings of silica, which remained almost entirely on the surface, whereas the same colloidal silica in the absence of hectorite soaked into the paper, so that no continuous layer of silica was obtained on the surface.

EXAMPLE 14

A mixture of 250 cc. of a sodium hydroxide-stabilized, colloidal silica sol containing 30% silica in the form of 15 millimicron particles and 1.5 grams of chrysotile asbestos fibers cut to one-quarter inch or less in length was placed in a 500 cc. ball mill. The mill was one-half full of porcelain balls approximately 1 inch in diameter. The mill was rotated for 16 hours and then contained a white, thickened suspension.

The suspension dried to a smooth film on glass. The film could be lifted from the glass and handled but was very brittle. When the suspension was applied to Kraft paper, the viscosity was great enough so that the solution did not soak into the paper but gave a good coating which did not rub off easily.

A sample of such a dispersion was held for over two years and had not gelled. Upon further storage, water slowly evaporated and the dispersion gelled and the gel shrank into a hard cylindrical replica of the glass container. The gel was sufficiently hard and tough so that it could be pounded on a table without breaking. This is in contrast to conventional gels of colloidal silica, which are highly strained and cracked and will shatter easily.

EXAMPLE 15

This preparation was carried out in a manner similar to that in Example 14 but a mixture of 1½ grams of chrysotile asbestos fibers (¼ inch long or less) and 1.5 grams of hectorite were added to 300 grams of a 30% colloidal silica sol stabilized with sodium hydroxide. The ball milling was carried out for 10 hours. The suspension appeared somewhat more viscous than that of Example 14 but it also formed a coherent, though brittle, film. The mixture was effective as a paper coating.

EXAMPLE 16

A mixture of 5 grams of No. 2 grade asbestos and 500 grams of the silica sol of Example 15 was placed in a Waring blendor, and agitated at high speed, and samples were removed at intervals of 1, 2, 3 and 5 minutes. The mixture was originally extremely thick and difficult to mix. At the end of 1 minute the viscosity was still very high and asbestos fiber bundles were visible to the naked eye. The mixture dried to a coherent, white film which was self-supporting. After 2 and 3 minutes of mixing, the fibers became progressively shorter and better dispersed but the mixture was still quite viscous and films were still opaque. At the end of 5 minutes the mixture had become highly fluid, and fibers or fiber bundles were no longer visible to the naked eye, but the mixture showed a pronounced schlieren effect when agitated.

A film cast from the mixture was self-supporting and quite translucent. Electron micrographs taken of this mixture showed that it contained chrysotile fibers several microns long and about 20 millimicrons in diameter. The small, 15 millimicron spherical silica particles bridged the areas between the fibers. Individual silica spheres appeared to be adhering to the surface of the fibers. Upon standing the dispersion did not settle out but became thixotropic and thickened. It could be refluidized by shaking.

EXAMPLE 17

No. 2 grade chrysotile asbestos fibers were ground through a hammer mill (Bantam micropulverizer) to give a fine cotton-like mass of disoriented fibers. A 3.5 gram sample of the asbestos with a fiber length of the order of 1 mm. or less was mixed with 346.5 grams of 30% $SiO_2$ colloidal silica aquasol in a Waring blendor for about 3 minutes. The dispersion was then mixed with 350 cc. of washed Ottawa sand and placed in a 1-liter stainless steel beaker. The mixture was then sand ground for 30 minutes by rotating in it a spindle containing 2 discs at a speed of 875 r.p.m. in accordance with the method disclosed in U.S. Patent 2,581,414 to Hochberg. The viscosity of the resulting product was 792 cp. on a Brookfield viscometer, using a No. 2 spindle at 30 r.p.m. The product dried to a self-supporting, though cracked, film.

EXAMPLE 18

A 285 gram sample of a 30% colloidal silica sol was placed in a high-speed, high-shear agitator (Osterizer). To this sol was added slowly 15 grams of attapulgite clay. The mixture was vigorously agitated for 10 minutes. The product was a slightly viscous but highly mobile fluid which was stable toward gelation. When poured onto a glass plate and dried, a smooth, partly crazed film resulted. Self-supporting sections of the film were about 1 inch long.

I claim:

1. A film-forming composition consisting essentially of a sol of isodiametric, water-insoluble ceramic metal oxide particles, the metal oxide being selected from the group consisting of zirconia, silica, alumina, thoria, didymia, and titania, and colloidally dispersed inorganic silicate mineral fibrils the greatest dimension of said fibrils being greater than 500 millimicrons and the other two dimensions being in the colloidal range not exceeding 150 millimicrons, and the fibrils being substantially free of fibers longer than ¼ inch, the composition containing from 10 to 70% by weight of said metal oxide and 0.1 to 10% by weight of said fibrils and the total weight of said isodiametric particles being at least twice the total weight of said fibrils.

2. A film-forming composition consisting essentially of an aquasol of isodiametric particles of a metal oxide selected from the group consisting of zirconia, silica, alumina, thoria, didymia, and titania, and colloidally dispersed inorganic silicate mineral fibrils the greatest dimension of said fibrils being greater than 500 millimicrons and the other two dimensions being in the collodial range not exceeding 150 millimicrons, and the fibrils being substantially free of fibers longer than ¼ inch the composition containing from 10 to 70% by weight of said metal oxide and 0.1 to 10% by weight of said fibrils and the total weight of said isodiametric particles being at least twice the total weight of said fibrils.

3. A film-forming composition consisting essentially of an aquasol of isodiametric particles of a metal oxide selected from the group consisting of zirconia, silica, alumina, thoria, didymia, and titania, the composition containing, by weight, from 10 to 70% of said metal oxide and 0.1 to 5% of colloidally dispersed asbestos in the form of fibrils having their greatest dimension greater than 500 millimicrons and their other two dimensions in the colloidal range not exceeding 150 millimicrons, the fibrils being substantially free of fibers longer than ¼ inch.

4. A film-forming composition consisting essentially of an aquasol of isodiametric particles of a metal oxide selected from the group consisting of zirconia, silica, alumina, thoria, didymia, and titania, the composition containing, by weight, from 10 to 70% of said metal oxide and 0.1 to 5% of colloidally dispersed hectorite in the form of fibrils having their greatest dimension greater than 500 millimicrons and their other two dimensions in the colloidal range not exceeding 150 millimicrons, the fibrils being substantially free of fibers longer than ¼ inch.

5. A film-forming composition consisting essentially of an aquasol of isodiametric particles of a metal oxide selected from the group consisting of zirconia, silica, alumina, thoria, didymia, and titania, the composition containing, by weight, from 10 to 70% of said metal oxide and 0.1 to 10% of colloidally dispersed attapulgite in the form of fibrils having their greatest dimension greater than 500 millimicrons and their other two dimensions in the colloidal range not exceeding 150 millimicrons, the fibrils being substantially free of fibers longer than ¼ inch, and the total weight of said isodiametric particles being at least twice the total weight of said attapulgite.

6. A film-forming composition consisting essentially of a silica aquasol and a colloidally dispersed fibrous silicate mineral in the form of fibrils having their greatest dimension greater than 500 millimicrons and their other two dimensions in the colloidal range not exceeding 150 millimicrons, the fibrils being substantially free of fibers longer than ¼ inch, the composition containing from 0.1 to 10% by weight of said silicate mineral and from 15 to $$\frac{110}{(1+0.000667A)^3+0.6}$$

percent by weight of $SiO_2$ where A is the specific surface area of the silica.

7. A film-forming composition consisting essentially of a silica aquasol and colloidally dispersed asbestos in the form of fibrils having their greatest dimension greater 500 millimicrons and their other two dimensions in the colloidal range not exceeding 150 millimicrons, the fibrils being substantially free of fibers longer than ¼ inch, the composition containing from 0.1 to 5% by weight of asbestos and from 15 to $$\frac{110}{(1+0.000667A)^3+0.6}$$

percent by weight of $SiO_2$ where A is the specific surface area of the silica.

8. A film-forming composition consisting essentially of a silica aquasol and colloidally dispersed attapulgite in the form of fibrils having their greatest dimension greater than 500 millimicrons and their other two dimensions in the colloidal range not exceeding 150 millimicrons, the fibrils being substantially free of fibers longer than ¼ inch, the composition containing 0.1 to 10% by weight of said attapulgite and from 15 to $$\frac{110}{(1+0.000667A)^3+0.6}$$

percent by weight of $SiO_2$ where A is the specific surface area of the silica.

9. A film-forming composition consisting essentially of a silica aquasol and colloidally dispersed chrysotile asbestos in the form of fibrils having their greatest dimension greater than 500 millimicrons and their other two dimensions in the colloidal range not exceeding 150 millimicrons, the fibrils being substantially free of fibers longer than ¼ inch, the composition containing from 0.1 to 5% by weight of asbestos and from 15 to $$\frac{110}{(1+0.000667A)^3+0.6}$$

percent by weight of $SiO_2$ where A is the specific surface area of the silica.

10. A film-forming composition consisting essentially of of silica aquasol and colloidally dispersed chrysotile asbestos in the form of fibrils having their greatest dimension greater than 500 millimicrons and their other two dimensions in the colloidal range not exceeding 150 millimicrons, the fibrils being substantially free of fibers longer than ¼ inch, the composition containing from 15 to $$\frac{70}{(1+0.000667A)^3+0.6}$$

percent by weight of $SiO_2$ where A is the specific surface area of the silica, and from 0.1 to 3% by weight of asbestos.

11. A film-forming composition consisting essentially of an alkali-stabilized silica aquasol having a pH of 8 to 10.2 and colloidally dispersed chrysotile asbestos in the form of fibrils having their greatest dimension greater than 500 millimicrons and their other two dimensions in the colloidal range not exceeding 150 millimicrons, the fibrils being substantially free of fibers longer than ¼ inch, the composition containing from 0.1 to 3% by weight of asbestos and from 15 to $$\frac{70}{(1+0.000667A)^3+0.6}$$

percent by weight of $SiO_2$ where A is the specific surface area of the silica and falls in the range from 60 to 450 m.²/g.

References Cited in the file of this patent

UNITED STATES PATENTS

| | | |
|---|---|---|
| 2,366,516 | Geffcken et al. | Jan. 2, 1945 |
| 2,428,357 | Cohen | Oct. 7, 1947 |
| 2,450,327 | Cogan | Sept. 28, 1948 |
| 2,661,288 | Barbaras | Dec. 1, 1953 |

FOREIGN PATENTS

| | | |
|---|---|---|
| 4,556 | Great Britain | 1900 |

OTHER REFERENCES

Dana: A Textbook of Mineralogy, 3rd ed. (1922), p. 252.